Dec. 4, 1934.  J. E. GREENAWALT  1,982,803
PROCESS AND FURNACE FOR DISPOSING OF REFUSE MATTER
Filed July 23, 1932   2 Sheets-Sheet 1
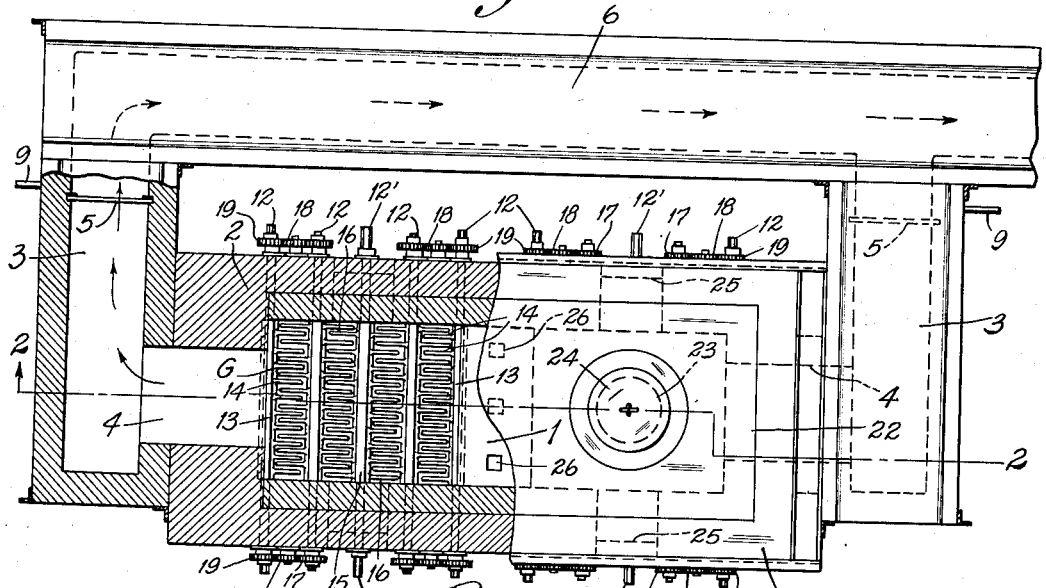
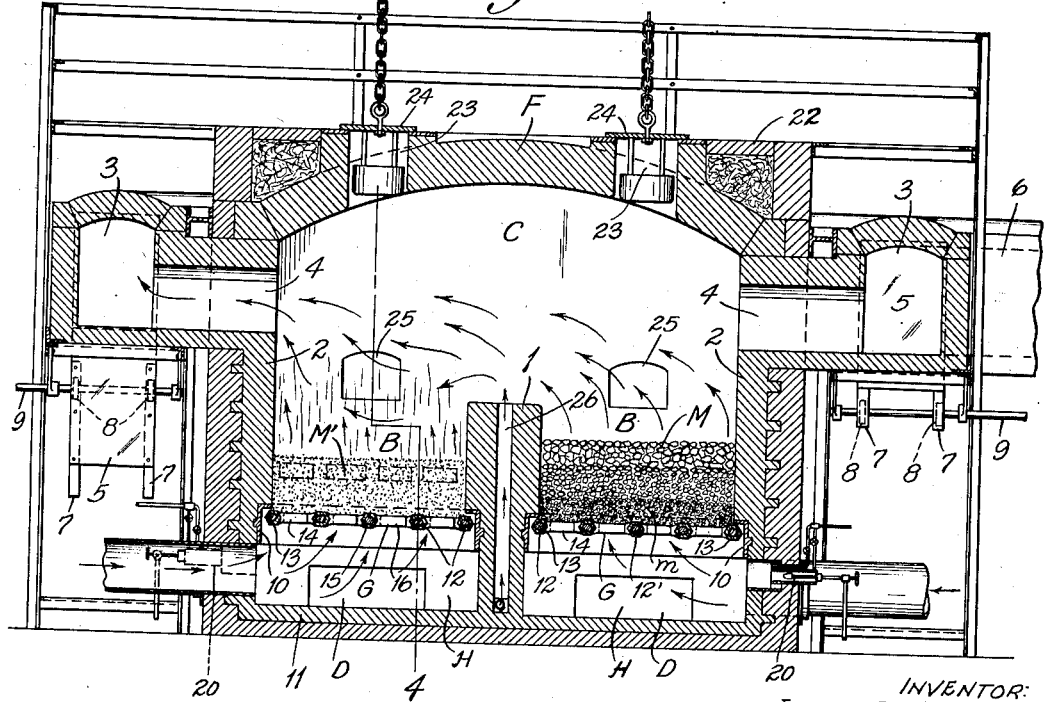
INVENTOR:
JOHN E. GREENAWALT
BY Harry A. Beimes
ATTORNEY.

Dec. 4, 1934.  J. E. GREENAWALT  1,982,803
PROCESS AND FURNACE FOR DISPOSING OF REFUSE MATTER
Filed July 23, 1932  2 Sheets-Sheet 2

INVENTOR:
JOHN E. GREENAWALT.
BY Harry A. Deines
ATTORNEY.

Patented Dec. 4, 1934

1,982,803

UNITED STATES PATENT OFFICE 1,982,803

PROCESS AND FURNACE FOR DISPOSING OF REFUSE MATTER

John E. Greenawalt, New York, N. Y.

Application July 23, 1932, Serial No. 624,229

1 Claim. (Cl. 110—8)

My invention has relation to improvements in processes and furnaces for disposing of refuse matter, and it consists of the novel features of construction more fully set forth in the specification and pointed out in the claims.

It is a well known fact that in burning refuse matter containing garbage a considerable amount of volatile matter is given off on account of the large water content which retards combustion. This volatile matter, as well as other gases and vapors expelled from the refuse matter, is accompanied by offensive odors which make incinerating plants as now constructed highly objectionable to the residents of the community.

Figure 3:
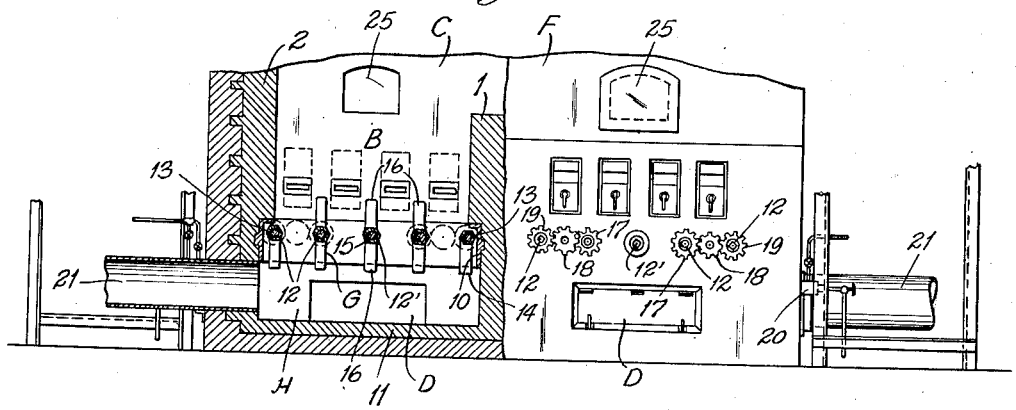
Figure 4:
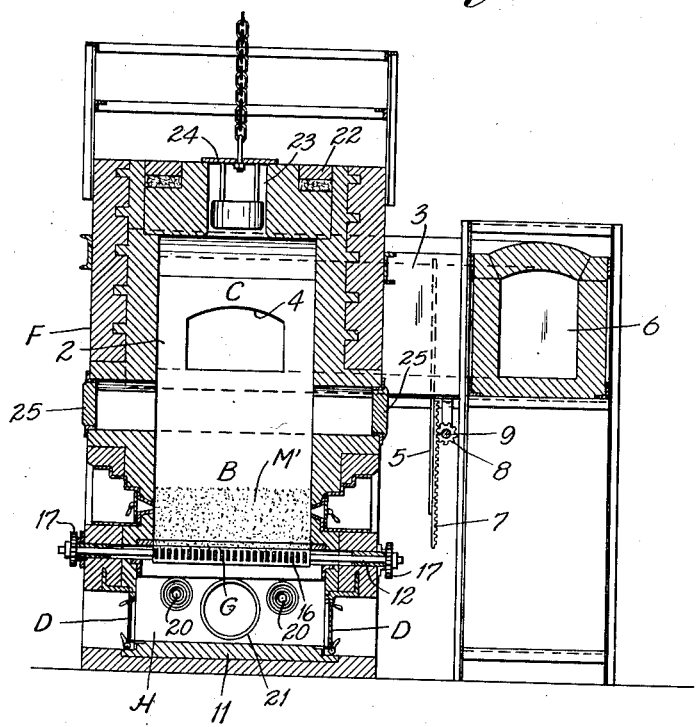

It is the object of the present invention to dispose of mixed refuse matter by incineration in a manner that will insure the complete oxidation of the gaseous products of combustion and thereby avoid the escape of noxious vapors into the atmosphere. I accomplish this object by providing what may be termed a duplex furnace in that it embodies two fire-box sections together with means for controlling the flow of the volatile gases through the combustion chamber above the fire-box sections so that these gases may always be caused to pass over an incandescent bed of material to insure their complete combustion and oxidation. It is a further object of the invention to provide a furnace wherein the material is incinerated by internal combustion of the mass which requires no extraneous heat after the charge has been ignited. This makes for economy of operation in that the incineration of material in the respective fire-boxes is carried on in such a manner that the heat of the incandescent mass in one fire-box serves to complete the combustion of the partially burned products expelled from the other fire-box. These advantages, as well as others inherent in the invention, will be better apparent from a detailed description of the same in connection with the accompanying drawings, in which:

Figure 1 is a combined top plan and horizontal section of my improved furnace; Fig. 2 is a vertical longitudinal section taken on the line 2—2 of Fig. 1; Fig. 3 is a combined front elevation and section taken on the same plane as the section in Fig. 2, the grate bars, however, being shown in dumping position; and Fig. 4 is a vertical cross-section taken on the line 4—4 of Fig. 2.

Referring to the drawings, F represents a furnace in which is provided a transverse bridge wall 1 so as to provide together with the end walls 2, 2 adjacent fire-boxes B, B. Above the fire-boxes B, B is the combustion chamber C for both fire-boxes B, B. At each end of the furnace F is a flue 3 in communication with the combustion chamber C by means of a flue passage 4. A gate damper 5 is mounted for operation in each of the flues 3, 3 in close proximity with the point where each flue connects with the main flue 6, which leads to the chimney (not shown). Each of the dampers 5 is provided with suitable mechanism, in the present instance with a pair of rack bars 7, 7 and pinions 8, 8 mounted on the shaft 9, whereby they may be raised to shut off the flue or lower it to place the flue in communication with the combustion chamber C. Thus the products of combustion may be caused to traverse the combustion chamber C in either direction so as to discharge through either the left hand or the right hand flue passage 4. A grate frame 10 is mounted in each fire-box B a suitable distance above the bottom 11 of the furnace for the purpose of supporting a grate G. A series of shafts 12 and 12' are rotatably mounted in said frame 10 in suitable spaced relation. In the present instance there are five such shafts in each grate frame and a grate section 13, 13 having grate bars 14 extending only in one direction are mounted on the end shafts 12, 12. The intermediate shafts 12' have grate sections 15 mounted on them and each section has grate bars 16, 16 extending from both sides. Obviously, the grate must be fixed to the shafts 12, 12' for which reason I make shafts 12, 12' polygonal in shape and provide the grates with hubs properly shaped to receive the shafts. All of the shafts 12 and 12' project through the furnace wall (as shown in Figs. 3 and 4) and are connected by gears 17, 18 and 19, as shown, so that the grate may be dumped in sections. The center shaft 12' is not geared to the others so that it is independently actuating. Obviously, the mechanism whereby the grate is moved to dumping position is not materially the present invention, and I have merely shown such dumping mechanism more or less conventional.

Separated from each fire-box B by each grate G is a flame confining chamber H adapted to be filled with flame for the purpose of igniting the charge of material M on either grade G. Fuel is introduced into the chamber H by suitable burners 20, 20 and air is forced into said chamber H through an air conduit 21. A suitable blower (not shown) connected to the conduit 21 insures an adequate air supply to the chamber H under any desired pressure, as is well understood in the art.

At the top of the furnace F is a charging floor 22 and the refuse matter to be incinerated is charged from this floor through openings 23, 23 in the furnace roof, one of said openings being directly over each of the grates G. A closure device 24 is provided in each opening 23 and suitable mechanism (not shown) may be provided for facilitating the opening and closing of said openings. Preferably, the refuse matter is rated as to size before being charged into the furnace, and the smaller particles (containing cinders and unburnt fuel) are first charged onto the grate G and leveled by an operator working through the leveling door 25. After having formed a more or less compact bed of uniformly combustible material M, the larger pieces of refuse matter are charged on top of this bed until a charge of desired depth is obtained. The charge is then ignited by putting the burners 20, 20 into operation to fill the igniting chamber H with flame and causing said flame to be projected upwardly by the air blast entering the igniting chamber through the conduit 21 whereby the layer $m$ of material on the grate G is completely and thoroughly ignited over its bottom surface. The burners 20, 20 are then shut off, the air blast however being continued so as to support combustion upwardly through the entire mass of material $m$. As above stated, at the beginning of the incinerating action in the bed $m$ considerable volatile matter is expelled together with other gases having highly obnoxious odors. For this reason the fire-boxes are charged and the charge is ignited alternately. This will be more apparent by referring to Fig. 2 of the drawings, in which a fresh charge of material M is shown in the right hand fire-box B and a bed of incandescent material M' shown in the left hand fire-box B. The bed in the left hand fire-box we will assume was charged to begin operations within the furnace F. After charging and igniting the material in the left hand fire-box B, the right hand fire-box B was charged in the manner above explained. However, the material in the right hand fire-box was not ignited until the material in the left hand fire-box had burned to incandescence and was no longer expelling partially burnt gases. When this state of combustion is reached in the left hand fire-box the charge in the right hand fire-box is ignited and the damper 5 in the right hand flue is closed while the damper 5 in the left hand flue is opened. The draft is now through the combustion chamber C from right to left, and as the volatile matter is expelled from the fresh charge in the right hand fire-box it will be carried over the bridge wall 1 and over the incandescent bed in the left hand fire-box. Obviously, as the volatile matter passes over this incandescent bed and mingles with the highly heated products of combustion, the combustion of such volatile matter will be completed by the time the gases enter the left hand flue 4, the oxidation is complete and they no longer include such gases as are objectionable because of odor. In order to insure that there will be an adequate supply of air mixed with the volatile matter that passes over the incandescent bed air ducts 26 are provided in the bridge wall 1 for conducting an auxiliary supply of air to the volatile matter as it passes over the bridge wall.

By the time all of the volatile matter has been expelled from the right hand bed of material the left hand bed has been completely burned and is ready for dumping. The grates are then manipulated so as to dump the material into the chamber H after which a fresh charge of material is placed upon the grate and the positions of right and left hand dampers 5 reversed so as to cause the draft to traverse the combustion chamber from left to right. After the material in the left hand bed has been ignited the volatile matter escaping therefrom will pass over the incandescent bed to the right and the same action takes place as before, ad infinitum.

Obviously, the ignition chamber H should be practically air-tight so as to confine and direct the air for combustion upwardly through the grates G, G, as well as the igniting flame from the burners 20, 20. The completely incinerated material that has been dumped into the chamber H, which also serves as the ash pit, is removed by pulling down the ash pit doors D, D and raking the material through the openings thereof.

Having described my invention, I claim:

The method of disposing of refuse matter which comprises charging and arranging the matter according to uniformity of combustibility on a pervious support, applying a mass of confined flame and highly heated products of combustion to the surface of the charge containing the more uniformly combustible component to ignite said charge over substantially the entire surface, causing a blast of air to traverse the charge from the ignited surface to support combustion of the charge, controlling the flow of the volatile products of partial combustion through a confined space, and causing said volatile products to traverse a highly heated zone in said confined space for further combustion.

JOHN E. GREENAWALT.